Figure 1:
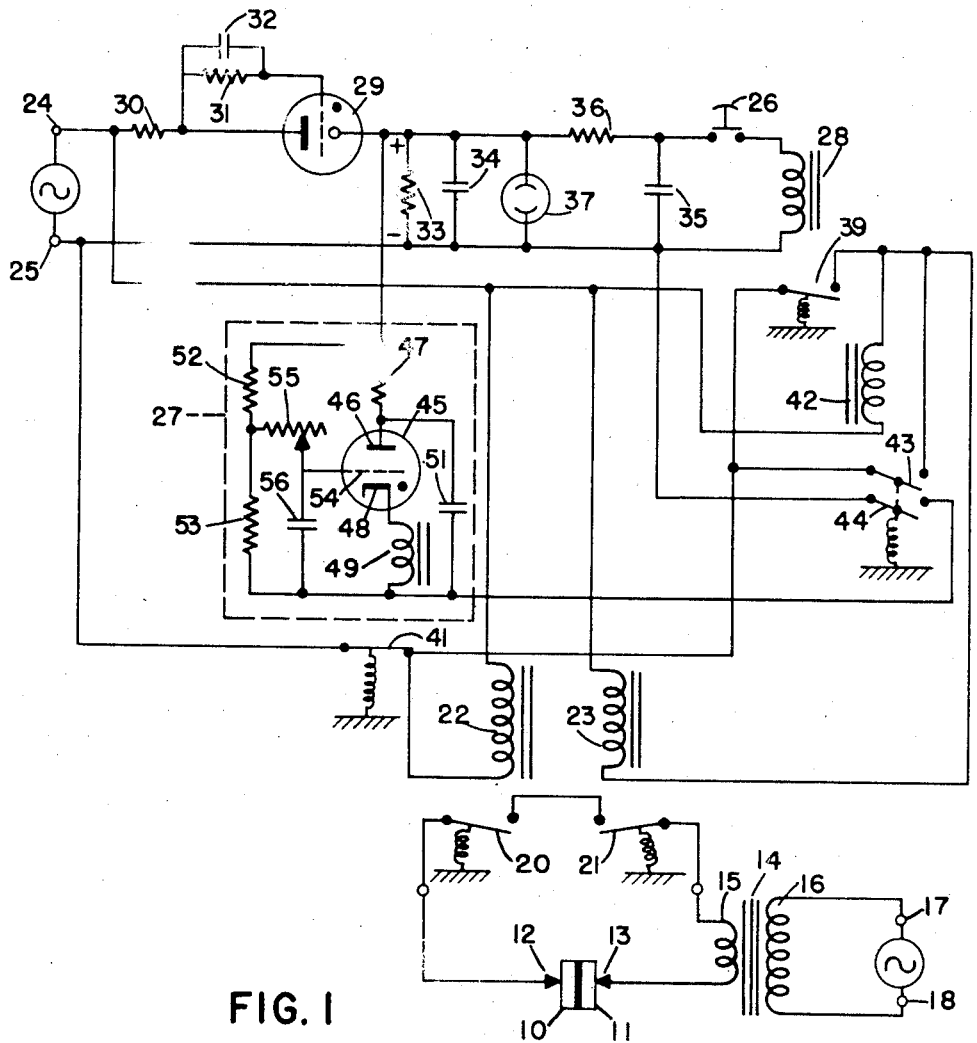

Aug. 30, 1949.  A. M. SKUDRE  2,480,678
WELDING TIMER
Filed July 26, 1947

INVENTOR.
ARNOLD M. SKUDRE
BY Elmer J. Gorn
HIS ATTORNEY

Patented Aug. 30, 1949

2,480,678

UNITED STATES PATENT OFFICE 2,480,678

WELDING TIMER

Arnold M. Skudre, Somerset, Mass., assignor to Raytheon Manufacturing Company, a corporation of Delaware Application July 26, 1947, Serial No. 763,829

6 Claims. (Cl. 175—320)

The present invention relates in general to welding timer apparatus and more particularly to electrically controlled welding timers wherein an electro-magnetic relay is employed to open and close the work circuit.

There are many forms of electrically controlled welding timer systems wherein an electromagnetic relay is employed to actuate the work circuit, some with and some without timing devices to control the relay. When it is desired to spot or chain weld with short bursts of current, it often happens that the relay which controls the work circuit does not make and break fast enough to provide uniform weld spots, with the result that some of the weld spots may be weak due to insufficient welding, or to burning or crystallizing of the material as a consequence of too much current. It is well known that spot and chain welding are more efficiently carried out when the current bursts are uniformly controlled. The use of an electronic timer to control the work circuit relay does not provide such efficiency since the relay mechanism has substantial mechanical inertia, especially in view of the fact that such relays must ordinarily be of the heavy duty type. Thus the precise control that might be afforded by an electronic timer is not fully taken advantage of, particularly when very short control bursts are desired.

The present invention provides a system wherein a pair of work circuit control relays are advantageously combined in an electrically timed welding control circuit, one to close and the other to open the work circuit precisely at the instants desired, so that the inertia of the circuit-closing relay has no effect upon the circuit-opening function. The two relays include a pair of switches which are arranged in series connection in the work circuit, each relay coil controlling one switch. When power is furnished to the apparatus, the first relay coil is energized and its switch is closed. When a welding operation is to be initiated, a momentary contact hand-operated switch is actuated, and the second relay is energized, closing the second switch, applying power to the work to be welded. Simultaneously with the energizing of the second relay coil, an electronic timer is energized, and, after the expiration of an interval of time, this electronic timer removes power from both of the relay coils, terminating the welding operation. The timer is designed to be positive and precise in its action so that the first relay is positively operated at exactly the desired moment to terminate the welding operation. The apparatus is furnished with holding contacts across the hand-operated switch, and has repeat cycle features that are desirable on spot or chain welding timer controls.

Figure 2:
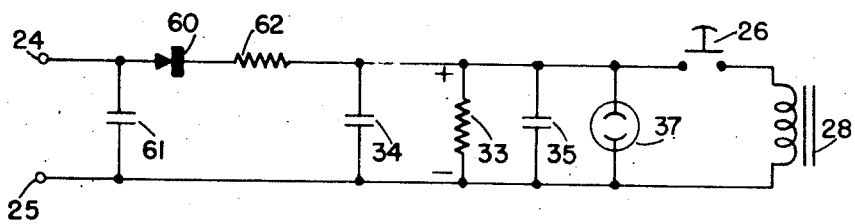

Further advantages and features of the invention and particular details thereof will be better understood from the description that follows, reference being made to the accompanying drawing wherein Fig. 1 illustrates an embodiment of the invention in electrical scheme, and Fig. 2 illustrates a modification of Fig. 1.

In Fig. 1, two articles 10 and 11 which are to be welded together are clamped between the jaws 12 and 13 of a welding machine. A welding transformer 14 having a high current low voltage secondary winding 15 and a high voltage low current primary winding 16 furnishes welding current to the work when connected to a source of alternating current at its primary input terminals 17 and 18. The jaws 12 and 13 and the secondary winding 15 are connected in series with a pair of single-pole single-throw normally-open relay-operated switches 20 and 21. This last-mentioned series circuit may be termed a work circuit. The first work circuit switch 20 is controlled by a first power relay coil 22 which closes the switch when energized with electric current. The second work circuit switch 21 is similarly controlled by a second power relay coil 23. As will appear below, the first power relay coil 22 is energized when power is applied to the apparatus at power input terminals 24 and 25, and the second power relay coil 23 is energized when a hand-operated, normally-open contactor switch 26 is manually closed. An electronic timer 27 (shown in a dotted line box) is actuated simultaneously with the second power relay coil 23, and serves to interrupt the current that energizes the first power relay coil 22, after the expiration of an interval of time.

The power input terminals 24 and 25 connect power to a rectifier circuit as well as to the electrical circuit of the two-power relay coils 22 and 23. The rectifier circuit includes a gaseous rectifier tube 29, which may be of the cold cathode type and furnishes unidirectional current for a first sensitive D. C. relay coil 28 and for the timer 27. The rectifier tube 29 is connected in series with the contactor switch 26 and the sensitive relay coil 28 across the power input terminals 24 and 25. A current-limiting resistor 30 is connected between the anode of the tube 29 and the first power input terminal 24. A grid-biasing arrangement, including in parallel a resistor 31 and a capacitor 32, is connected between the grid and the anode of the tube. A bleeder resistor 33 is connected between the cathode of the tube and the other power input terminal 25, and constitutes a unidirectional current source for the timer 27. A filter network, including two capacitors 34 and 35 and a resistor 36, serves to smooth the output of the rectifier tube. A gaseous lamp 37, which may be a neon bulb, is connected in parallel with the bleeder resistor 33 and serves to indicate that the rectifier is furnishing power, and may also function as a voltage regulator to protect the sensitive relay 28 and the timer 27. When the contactor switch 26 is manually actuated to a closed-circuit position, the sensitive relay 28 is energized and closes a normally-open single-pole single-throw switch 39.

The first power relay coil 22 is connected across the power input terminals 24 and 25 through a normally-closed single-pole single-throw switch 41 and is energized immediately upon the application of power to the power input terminals. The normally-closed switch 41 and the normally-open switch 39 are connected in series with the second power relay coil 23, and when the sensitive relay 28 closes the normally-open switch 39 the second power relay coil 23 is energized from the power input terminals 24 and 25, being then connected thereto in parallel with the first power relay coil 22. A third relay coil 42 is connected to the power input terminals 24 and 25 exactly in the same fashion as the second power relay coil 23, that is, under control of the normally-closed switch 41 and the normally-open switch 39, and hence is likewise actuated when the normally-open switch 39 is closed by the sensitive relay coil 28. This third relay coil controls first and second normally-open single-pole single-throw switches 43 and 44, respectively, which may be ganged together, as shown. The first of these switches 43 is connected in parallel with the normally-open switch 39 of the sensitive relay 28 and provides a holding circuit for the normally-open sensitive relay switch 39, permitting the actuator switch 26 to be released after being momentarily depressed to start a welding operation. The second of these switches 44 connects the timer 27 to the rectifier system to initiate operation thereof.

The timer 27 comprises a grid-controlled electron tube 45, which may be a "Thyratron." The anode 46 of this tube is connected to the cathode of the rectifier tube 29 through a current-limiting resistor 47, while the cathode 48 of the timer tube is connected to the other side of the rectifier circuit through a second sensitive relay coil 49 and the aforementioned switch 44. The unidirectional voltage developed across the bleeder resistor 33 is thus furnished to the timer tube 45. A storage capacitor 51 is connected from the anode 46 of the timer tube 45 to the junction point between the second sensitive relay 49 and the timer control switch 44. A voltage divider network comprising two resistors 52 and 53 connected in series across the timer tube 45 furnishes a control potential for the grid 54 of the timer tube 45. A rheostat 55 is connected one end to the junction point between the voltage divider resistors 52 and 53 and at the movable tap thereof to the grid 54. A second storage capacitor 56 is connected from the grid 54 to the cathode end of the voltage divider network. When the timer control switch 44 is closed by the third relay 42, unidirectional voltage is applied to the timer 27, and the two capacitors 51 and 56 begin to charge. The first capacitor 51 is dimensioned so that it charges faster than the second capacitor 56 in the grid circuit. When the second capacitor 56 has charged to a sufficiently high potential with relation to the cathode potential of the tube 45, and to the anode potential as controlled by the first capacitor 51, the tube fires and the charge accumulated on the first capacitor 51 is discharged in the form of a sharp burst or pulse of current through the second sensitive relay coil 49. The normally-closed switch 41 is quickly and positively opened when the second sensitive relay coil 49 is thus energized, and power to the first power relay coil 22, the second power relay coil 23, and the third relay coil 42 is interrupted. The first power relay coil then quickly releases the first work circuit switch 20, there being no delay such as may occur in the second power relay coil 23 and its switch 21 if the welding operation was a short one. The third relay coil 42 permits its switches 43 and 44 to open, removing the holding contact around the first sensitive relay switch 39 and disconnecting the timer 27 from the unidirectional current source 33. Disconnection of the timer permits the timing or grid capacitor 56 to discharge to zero voltage through resistors 53 and 55, and allows the normally-closed switch 41 to close, and the system is then almost immediately ready for another spot welding operation, under the control of the hand-operated contactor switch 26. The time delay between closing the contactor switch 26 and the furnishing of the timer current pulse through the second sensitive relay coil 49 by the timer 27 may be varied with the rheostat 55. Greater variations may be had by changing the relative values of the timing capacitors 51 and 56.

Fig. 2 illustrates a modification of the unidirectional voltage supply of the device shown in Fig. 1. A dry rectifier 60 is substituted for the tube 29 and an input capacitor 61 is connected directly across the power input terminals 24 and 25. A series-connected resistor 62 performs current-limiting and filtering functions, and the filter capacitors 34 and 35 are retained. The unidirectional voltage is developed across the resistor 33, the indicator lamp 37 is retained, and power is applied to the first sensitive relay 28 under control of the hand-operated switch 26, as in the apparatus shown in Fig. 1. The voltage developed across the resistor 33 may be applied to the timer 27 in the same manner as in the arrangement of Fig. 1.

Having now described my invention, I claim:

1. In an electrical welding system having a work circuit, apparatus for controlling the energization of said work circuit comprising: a heavy duty closing relay and a heavy duty opening relay having switch contacts serially connected in the work circuit; separate operator means for each of said relays; an electronic timing device; a power source therefor; means including a sensitive relay in the anode-cathode circuit of said timing device for connecting the timing device to said power source, and initiating the operation thereof, and having a set of switch contacts arranged for simultaneously operating the operator means of the closing relay to complete power to the work circuit; and second sensitive relay means operative by the electronic timer at the end of the operation for operating the operator means of the opening relay to interrupt power to the work circuit.

2. In an electrical welding system having a work circuit, apparatus for controlling the energization of said work circuit comprising: first and second switches arranged to effect energization of said work circuit when both switches are in a closed-circuit condition; individual operator means for controlling said switches; a source of power for energizing said operator means to operate both of said switches to a closed-circuit condition; a normally-closed switch connected between both of said operator means and said source of power; a normally-open initiating switch connected between the operator means of said second switch and said source of power; means for closing said initiating switch; an electronic pulse generator adapted to initiate a pulse of electric current at a time after being energized, and arranged to be energized when said initiating switch is closed; and relay means in circuit with said pulse generator and arranged to open said normally-closed switch when energized by a current pulse from said pulse generator.

3. In an electrical welding system having a work circuit, apparatus for controlling the energization of said work circuit comprising: first and second switches arranged to effect energization of said work circuit when both switches are in a closed-circuit condition; individual operator means for controlling said switches; a source of power for energizing said operator means to operate both of said switches to a closed-circuit condition; a normally-closed switch connected between both of said operator means and said source of power; a normally-open initiating switch connected between the operator means of said second switch and said source of power; relay means for closing said initiating switch; in parallel connection, a storage capacitor and the anode-cathode path of an electron discharge tube; a source of unidirectional current; said tube being arranged to become conductive in said path at a time after the application thereto of said unidirectional current; means controlled by said relay means for applying said unidirectional current to said capacitor and tube in parallel substantially simultaneously with the closing of said initiating switch; and second relay means in the anode-cathode circuit of said tube arranged to open said normally-closed switch when energized by the current discharged from said capacitor when said tube becomes conductive.

4. In an electrical welding system having a work circuit, apparatus for controlling the energization of said work circuit comprising: first and second switches arranged to effect energization of said work circuit when both switches are in a closed-circuit condition; individual operator means for controlling said switches; a source of power for energizing said operator means to operate both of said switches to a closed-circuit condition; a normally-closed switch connected between both of said operator means and said source of power; a normally-open initiating switch connected between the operator means of said second switch and said source of power; relay means for closing said initiating switch; in parallel connection, a first storage capacitor, the anode-cathode path of a grid-controlled electron discharge tube, and a voltage divider having a second storage capacitor connected at one side to the cathode side of said discharge path; a connection from the control grid of said tube to the other side of said capacitor; a source of unidirectional current; means controlled by said relay means for applying said unidirectional current to said parallel connection substantially simultaneously with the closing of said initiating switch; said capacitors both charging in a direction to render both the anode and the control grid of said tube positive with relation to the cathode thereof, said first capacitor charging to a higher potential than said second capacitor until said tube is rendered conductive and said first capacitor is discharged through said anode-cathode path; and second relay means in the anode-cathode circuit of said tube arranged to open said normally-closed switch when energized by the current discharged from said capacitor when said tube becomes conductive.

5. Apparatus as claimed in claim 2 wherein a second relay means is provided which is connected to be energized from said source when said initiating switch is closed, and having a second normally-open switch connected in parallel with said initiating switch, said second relay means closng said second normally-open switch when energized, whereby said initiating switch need be closed only momentarily and said second normally open switch provides a holding circuit in place thereof after said second relay means has been energized; said pulse generator being maintained energized by said second relay means after the momentary closing of said initiating switch.

6. Apparatus as claimed in claim 2 wherein a second relay means is provided which is connected to be energized from said source when said initiating switch is closed, and having a second normally-open switch connected in parallel with said initiating switch and a third normally-open switch connected in the energization circuit of said pulse generator; said second relay means closing both said second and said third normally-open switches when energized; whereby said initiating switch need be closed only momentarily and said second normally-open switch provides a holding circuit in place thereof after said second relay means has been energized; said third normally-open switch maintaining said pulse generator energized after the momentary closing of said initiating switch.

ARNOLD M. SKUDRE.

REFERENCES CITED

The following references are of record in the file of this patent:

UNITED STATES PATENTS

| Number | Name | Date |
|---|---|---|
| 2,339,750 | Bartholy | Jan. 25, 1944 |